United States Patent [19]

Wheeler

[11] Patent Number: 4,652,380
[45] Date of Patent: Mar. 24, 1987

[54] METHOD OF TREATING THE ARSENIC CONTAINING FILTER MEDIA FROM PHOSPHORIC ACID PURIFICATION

[75] Inventor: Donald R. Wheeler, Antioch, Tenn.

[73] Assignee: Stauffer Chemical Company, Westport, Conn.

[21] Appl. No.: 751,925

[22] Filed: Jul. 5, 1985

[51] Int. Cl.$^4$ .............................................. B01D 41/02
[52] U.S. Cl. ..................... 210/724; 210/772; 210/797; 210/911; 423/87; 423/321 R
[58] Field of Search ............... 210/710, 711, 724, 726, 210/768, 772, 777, 778, 797, 798, 911; 134/25.1; 423/316, 321 R, 511, 601, 602, 561 R, 87

[56] References Cited

U.S. PATENT DOCUMENTS

| 3,608,721 | 9/1971 | Lopker ................................. 210/772 |
| 4,215,098 | 7/1980 | Lowe et al. .......................... 423/305 |
| 4,369,168 | 1/1983 | Wells et al. ....................... 423/321 R |
| 4,547,295 | 10/1985 | Carr, Jr. et al. ................. 423/321 R |

FOREIGN PATENT DOCUMENTS

| 49-47299 | 5/1974 | Japan ................................. 210/911 |
| 54-99349 | 8/1979 | Japan ................................. 210/911 |
| 57-38313 | 3/1982 | Japan ............................. 423/321 R |
| WO79/00086 | 2/1979 | PCT Int'l Appl. ................. 210/798 |
| 444406 | 8/1977 | U.S.S.R. ............................ 210/911 |

Primary Examiner—Peter Hruskoci
Attorney, Agent, or Firm—Vivienne T. White

[57] ABSTRACT

Filter cake waste media from a phosphoric acid purification process containing contaminating amounts of arsenic is treated in the process of this invention to remove the arsenic therefrom and to render the filter media suitable for reuse. The process of the invention comprises separating the arsenic contaminant from the filter material by treating the material with sufficient amount of a base, such as soda ash, to dissolve the contaminating arsenic compounds into solution and separating and recovering the filter media from the arsenic-containing solution. The separated arsenic can be recovered by reprecipitation utilizing an acid and a source of soluble sulfide ions.

7 Claims, No Drawings

METHOD OF TREATING THE ARSENIC CONTAINING FILTER MEDIA FROM PHOSPHORIC ACID PURIFICATION

BACKGROUND OF THE INVENTION

1. Field of the Invention

The invention is directed to decontaminating the filter media utilized in the purification of phosphoric acid produced by the electrothermal method.

2. Related Art

In a thermal process, phosphoric acid is produced from elemental phosphorus by burning the phosphorus in air and hydrating the resulting $P_4O_{10}$ vapor to form the acid. The only impurity of significance is elemental arsenic. In the production of phosphoric acid, the arsenic is converted to arsenic and arsenous acid. In order to produce a phosphoric acid suitable for food uses, these compounds must be removed. This is accomplished by sulfiding the acid using hydrogen sulfide or other sources of hydrogen sulfide such as sodium hydrogen sulfide and sodium sulfide. The precipitated arsenic sulfides are then removed from the phosphoric acid by pressure filtration, which is usually accomplished using diatomaceous earth as a filter aid. The filter cake produced after filtration is composed largely of the filter material such as diatomaceous earth with arsenic sulfide levels of 1-2%. This contaminated filter material cannot be easily disposed of since it is a regulated hazardous waste. It is an object of the invention to remove the arsenic sulfide from the filter material in order to not only decrease the volume of waste to be disposed of but also to render the filter material suitable for reuse.

SUMMARY OF THE INVENTION

A method of removing arsenic impurities from filter material utilized in the process of purifying phosphoric acid has been discovered. The process for removing the arsenic contaminants comprises treating the contaminated filter media with a base to dissolve the arsenic contaminants, and separating, and optionally washing the filter media to remove therefrom the dissolved arsenic contaminant to render the filter media suitable for reuse. The invention further comprises a method of recovering the aresenic from the separated solution which method is the addition of an acid and a source of soluble sulfide ions to the recovered solution to precipitate therefrom the arsenic contaminants. The method of this invention makes possible the reuse of the filter media in further phosphoric acid purification processes.

DETAILED DESCRIPTION OF THE INVENTION

In the invention disclosed herein the filter media used in purifying phosphoric acid produced by the electrothermal process is decontaminated and made suitable for reuse. The decontamination process is essentially a method of removing contaminating arsenic sulfides from the filter media by dissolving the arsenic sulfide contaminating material, after washing, with a base and separating the contaminating material prior to washing the filter media to render it suitable for reuse.

The invention also comprises reprecipitating and recovering the arsenic from the filtrate by contacting with an acid and a source of soluble sulfide ions.

The arsenic contaminating compounds, generally $As_2S_3$ and $As_2S_5$, have been found to be soluble in bases by forming dithioarsenite and can be reprecipitated upon the addition of an acid and a soluble source of sulfide ions. They are also soluble in alkaline sulfides, such as sodium sulfide forming tetra-thiol-arsenite and arsenates. Desirable compounds for use in solubilizing the arsenic contaminating compounds are soda ash, sodium bicarbonate, sodium hydroxide or other bases.

The process of the invention comprises treating the filter media with the base to dissolve the sulfide impurities. A filter media generally used in the phosphoric acid purification process is diatomaceous earth. Other filter aids (media), however, can be treated in the manner disclosed.

Because of its handling convenience, soda ash is the preferred base for use in practicing the invention. Sufficient base should be added to achieve a pH of about 9 or more. After dissolving the sulfide impurities, the filter media is separated from the arsenic containing solution by filtration, sedimentation or other known means. The filter media can be optionally washed to substantially remove the soluble arsenic sulfide or it can be disposed of without washing as a non-hazardous waste. For reuse in the phorphoric acid purification process, the media should be washed prior to use.

The sulfide containing solution recovered after separation of the filter material can be treated to recover the arsenic. In the process of the invention the solution is treated with an acid to lower the pH, and a source of soluble sulfide ions to reprecipitate the arsenic sulfide. The pH is lowered to about less than about 2. The addition of a soluble source of sulfide ions insures that soluble arsenic ions will precipitate out of the solution. In the process, the source of soluble sulfide ions and the acid can be added either simultaneously or in any order. Thereafter, the arsenic containing solution is filtered, preferably using a paper filter, to recover the arsenic.

Any acid or source of soluble sulfide ions can be used in practicing the invention. In addition, any strength acid can be used since the criteria is the lowering of the pH to an acceptable level. Of course, a concentrated solution is preferred for economic reasons since a lesser amount would be required to achieve the required pH level.

Although it is not necessary to wash the arsenic-containing filter media prior to treatment, such washing is preferred since it would lessen the amount of base required to solubilize the arsenic.

The following Examples are exemplary of the process of the invention and are not designed to limit the scope of the invention.

EXAMPLE 1

50 grams of washed wet filter cake (diatomaceous earth) from a phosphoric acid purification process was suspended in 500 mls of deionized water on a hot plate with stirring and was heated to 50° C. A 2.5 grams amount of soda ash (McKesson Light brand) was then added in portions to bring the pH to 9.0. The mixture was allowed to stir for 30 minutes while cooling. The filter media was removed by filtration through a Whatman GF/A (7 cm) glass filter paper and washed with deionized water and allowed to dry at 60° C. overnight. A 25.9 gram amount of white filtrate solids was recovered.

To the filtrate above was added 4.0 grams of 98% sulfuric acid which lowered the pH to approximately 1.5. To this mixture was added 1.0 grams of NaSH (PPG source, technical). The mixture was stirred for about 30 minutes and was filtered through a Whatman GF/A (7 cm) paper. The precipitated yellow arsenic sulfide cake was washed about three times with small portions (about 10–20 mls each) of deionized water. The filter cake was then dried at 60° C. overnight giving 1.9 grams of arsenic sulfide product.

The filtrate was completely colorless, contained no particles and was heated to boiling to expel hydrogen sulfite gas so that arsenic levels can be determined. The results were 6 parts per million arsenic remaining in the filtrate.

EXAMPLE 2

50 grams of wet washed filter cake was slurried in 500 mls of deionized water to which was added 2.5 grams of soda ash with stirring on a hot plate for thirty minutes. The mixture was filtered through a 7 cm Whatman GF/A filter paper and the filter cake was then washed with 50–100 mls of deionized water and dried at 60° C. overnight.

To the filtrate above was added 3.0 grams of 97% sulfuric acid which lowered the pH to about 2.0. The mixture was stirred for 15 minutes and filtered. Approximately 10–15 mls of this filtrate was set aside for arsenic analysis and was found to have an arsenic content of about 100 ppm. The filter cake was dried at 60° C. The remaining filtrate was treated with 1.0 grams NaSH (powdered) for about 30 minutes and was filtered as disclosed in the previous Example. Arsenic analysis gave 40 ppm as $As_2O_3$ and 30 ppm as free arsenic.

EXAMPLE 3

50 grams of an arsenic-containing filter cake was slurried in 250 mls of deionized water using a stirrer and hot plate but no heat. The mixture was stirred and 3.0 grams of soda ash was added to raise the pH to 9.5. The mixture was filtered to recover the filter media, as previously disclosed, and the filter media was washed with 75 mls of deionized water. The washed filter media was dried at 60° overnight giving a 26.0 gram media recovery.

3.3 grams of 97% $H_2SO_4$ was then added to the filtrate thereby lowering the pH to 2.0. After stirring the filtrate for ten minutes, the $As_2S_3$ precipitate was allowed to settle. A 5–10 ml sample of the arsenic filtrate supernate solution was tested for $As_2O_3$ which was found to be about 200 parts per million. The mixture was then treated with 1.0 grams of NaSH and filtered as in previous Examples. The $As_2S_3$ filter cake was washed with deionized water (about 50–100 mls) and dried at 60° overnight giving a 2.1 gram arsenic product. The filtrate wash water was tested and was found to contain an arsenic level of 20 parts per million as free arsenic.

EXAMPLE 4

50 grams of a wet filter cake were slurried in 500 mls of deionized water to which 2.5 grams of soda ash was added. The mixture was filtered and the filter cake was washed twice with deionized water and dried at 60° C. giving a 25.8 grams of recovered filter media.

To the filtrate of the above was added 1 gram of NaSH with stirring for ten minutes and 10.0 grams of 97% $H_2SO_4$ which lowered the pH to 1. After stirring for another fifteen minutes the mixture was filtered as above and the $As_2S_3$ filter cake was washed twice with small portions of water comprising about 25 mls each, and dried overnight giving a 1.9 gram arsenic product. The filtrate was completely clear and when assessed for arsenic as $As_2O_3$ was found to contain 7.5 ppm.

What is claimed:

1. A process for decontaminating a filter media containing arsenic sulfide contaminants derived from the purification of phosphoric acid and recovering the arsenic contaminants contained therein comprising dissolving said arsenic sulfide contaminants in the filter media with sufficient base to produce a decontaminated filter media and an arsenic-containing solution having a pH greater than about 9, separating and recovering the filter media from the arsenic-containing solution, treating the arsenic-containing solution with an acid, to obtain a pH of less than about 2, and a source of soluble sulfide ions in an effective amount to reprecipitate and recover the arsenic from said solution, and separating said arsenic from said solution.

2. The process of claim 1 wherein the base is soda ash.

3. The process of claim 1 wherein the base is sodium hydroxide.

4. The process of claim 1 wherein the base is sodium bicarbonate.

5. The process of claim 1 wherein the source of soluble sulfide ions is sodium sulfide.

6. The process of claim 1 wherein the filter media is recovered by filtration.

7. The process of claim 1 further comprising washing the base treated filter media prior to recovery.

* * * * *